United States Patent [19]  [11] 4,211,602
Brumfield  [45] Jul. 8, 1980

[54] SURFACE TREATMENT FOR BLOOD DIALYSIS CARTRIDGES

[76] Inventor: Robert C. Brumfield, 455 S. Oakland Ave., Pasadena, Calif. 91101

[21] Appl. No.: 902,970

[22] Filed: May 4, 1978

[51] Int. Cl.² .................. B01D 13/00; B01D 39/16; B01K 1/00
[52] U.S. Cl. .................. 156/644; 156/645; 156/668; 210/321 A; 210/321 B; 427/2; 427/29 D; 428/376; 428/398; 428/409
[58] Field of Search .................. 156/668, 644, 645; 427/2, 290; 210/321 A, 321 B; 428/376, 409, 398

[56] References Cited

U.S. PATENT DOCUMENTS

| 2,651,811 | 9/1953 | Coney | 156/668 |
|---|---|---|---|
| 2,972,779 | 2/1961 | Cowley | 156/668 |
| 3,662,178 | 5/1972 | Caputi et al. | 156/668 |
| 3,713,921 | 1/1973 | Fleischer et al. | 156/668 |
| 3,802,972 | 4/1974 | Fleischer et al. | 156/668 |

Primary Examiner—J. C. Cannon
Attorney, Agent, or Firm—Phillips, Moore, Weissenberger, Lempio & Majestic

[57] ABSTRACT

In blood dialyzers in which hollow fibers are potted in plastic tube sheets and the tube sheets are then cut to form a manifold surface providing access to the interior of the hollow fibers, blood clotting at the manifold surface is greatly reduced by treating the surface to increase the radii of the microscopic sharp edges of the fiber ends which are produced by the cutting process. The smoothing of the fiber ends can be accomplished by momentary heating, flame polishing, etching, or coating of the manifold surface with a varnish.

7 Claims, No Drawings

SURFACE TREATMENT FOR BLOOD DIALYSIS CARTRIDGES

BACKGROUND OF THE INVENTION

In the construction of some types of hollow fiber membrane devices such as blood dialysis cartridges, the hollow fibers are terminated in tube sheets of cast plastic. As part of the manufacturing process, the tube sheets are cut to expose the inner hollow fiber passages to fluid headers. Such cutting and machining produce sharp edges at the surfaces where the hollow fibers emerge from the tube sheet intersections. Depending upon the cutting and machining method, the cut surface may contain rough edges, burrs, microfibers and other micro-size surface structures and sharp edges. This kind of micro-fuzzy surface has the same behavior as a microfiber filter which captures micro-particles from a fluid suspension at fixed sites having microradii.

In the operation of hollow fiber membrane devices with complex fluids having metastable suspensions of various particles such as animal blood, the precipitation of fluid components by the sharp edge mechanism produces particle deposits on the ends of the hollow fibers, and forms thrombi and emboli some of which become detached and block the hollow fibers internally or at fiber entrance points.

Specifically, in the operation of hollow fiber dialyzers as an artificial kidney for the treatment of blood, the sharp edge precipitation mechanism results in partial or complete blockage of the blood flow through the hollow fibers, depending upon the length of use and individual blood characteristics. The blocked hollow fibers decrease the membrane dialysis transfer area and thus degrade the performance of the artificial kidney.

SUMMARY OF THE INVENTION

The fiber filter effect and the sharp edge mechanism which causes precipitation of blood components on the tube sheet surfaces can be greatly reduced by eliminating micro structures of small radii at the tube sheet surface. Such sharp-edged surface structures have high surface energy and low heat conductivity and relax to edges of increased radii and lower particle attraction if the temperature is momentarily increased by the same mechanism as fire polishing of sharp edges in glass. The same high energy associated with the sharp edge mechanism enhances solution and chemical reaction effects at the sharp-edged surface structures when momentarily exposed to solvents or chemical reagents so as to increase the radii of the surface structures.

The sharp edge mechanism which captures particles from a suspension such as blood also is effective with a fluid varnish to increase surface structure radii by the same process by which the surface of wood is smoothed by coating it with varnish. The capillary tension effect of the fluid on the sharpe edges forms deposits of increased radii which become permanent on the setting of the varnish. In the varnishing process of improving tube header surfaces for reduction of blood component precipitation, loose and semi-loose surface debris are cemented in place and covered from contact with the blood.

The usual arrangement for hollow fiber membrane dialyzer devices comprises two tube sheets potted to the terminal ends of the hollow fiber bundle for access to the inner surfaces of the hollow fibers. If such a tube sheet surface accessing the hollow fiber interior passages were simply varnished, the hollow fibers would fill with varnish by capillary action. To prevent such tube blocking, a flow of gas out of the hollow fibers during the application and setting of the varnish keeps the varnish from entering and blocking the hollow fibers, but does not impede the rounding of the sharp edges at the hollow fiber entrance by the varnish. Such a gas flow can be introduced by pressurizing the outer surface of the hollow fibers with respect to the tube sheets or pressurizing one tube sheet while varnishing the opposite tube sheet surface.

DESCRIPTION OF PREFERRED EMBODIMENTS OF THE INVENTION

EXAMPLE 1

Prior to the installation of the blood manifolds on the tube sheets, the hollow fiber bundle with machined tube sheet surfaces is placed in a fixture which temporarily manifolds an air supply to one tube sheet surface. With air blowing out of the exposed tube sheet surface, a polyurethane varnish is applied and set while the air flows through the hollow fibers.

EXAMPLE 2

The finished machined tube sheet surface of a hollow fiber bundle assembly is exposed momentarily to a high flux of infrared radiation from a heat lamp source to relax the energy of the sharp edges of the tube sheet surface and increase the radii of the surface.

EXAMPLE 3

The finished machined surface of a hollow fiber tube sheet is exposed to a combustion flame or a flow of electrically heated gas to flame polish the surface by surface energy effects and high local heat transfer rates.

EXAMPLE 4

The finished machined surface of a hollow fiber tube sheet is exposed to a sparingly applied solvent by a roller applicator or stamp pad so as to relax the sharp edge energy of the surface structure by momentary solution and edge radii increase.

EXAMPLE 5

The finished machined surface of a hollow fiber tube sheet is exposed to a chemical reagent to polish the micro structure of the surface by the selective chemical reaction of the reagent with the high surface energy sharp edges of the surface structure.

I claim:

1. In the manufacture of blood dialysis equipment having hollow dialysis fibers whose ends are embedded in a plastic tube sheet which is then cut to form a manifold surface providing access to the interior of the fibers, a method which comprises minimizing the negative effects of rough edges at the fiber ends produced by the cutting process by causing the radii of the fiber ends to increase through heat treatment, chemical reaction, solvent action or chemical composition deposit.

2. The method of claim 1, in which said radii-increasing step includes exposing said surface to infrared radiation in such a manner as to relax the surface energy of sharp edges of said surface.

3. The method of claim 1, in which said radii-increasing step includes exposing said surface to a hot gas in such a manner as to flame-polish said surface.

4. The method of claim 1, in which said radii-increasing step includes exposing said surface to a sparingly applied solvent.

5. The method of claim 1, in which said radii-increasing step includes exposing said surface to a chemical reagent adapted to selectively react with high-energy sharp edges of said surface.

6. The method of claim 1, in which said radii-increasing step includes the application of a varnish to said surface.

7. The method of claim 6, further comprising the step of causing a gaseous fluid to flow out of the interior of said hollow fibers at said surface while said varnish is in a fluid state, to prevent penetration of said varnish into said fibers.

* * * * *

UNITED STATES PATENT OFFICE
CERTIFICATE OF CORRECTION

Patent No. 4,211,602　　　　　　　　Dated July 8, 1980

Inventor(s)　　　Robert C. Brumfield

It is certified that error appears in the above-identified patent and that said Letters Patent are hereby corrected as shown below:

Column 2, line 30 - after "surface" in the second instance insert --structures.--

Signed and Sealed this

Twenty-ninth Day of June 1982

[SEAL]

Attest:

Attesting Officer

GERALD J. MOSSINGHOFF

Commissioner of Patents and Trademarks